(12) United States Patent
Jin et al.

(10) Patent No.: US 7,796,854 B2
(45) Date of Patent: Sep. 14, 2010

(54) HOLLOW-CORE PHOTONIC BANDGAP FIBER POLARIZER

(75) Inventors: Wei Jin, Hong Kong (HK); Haifeng Xuan, Hong Kong (HK)

(73) Assignee: The Hong Kong Polytechnic University, Hong Kong (CN)

( * ) Notice: Subject to any disclaimer, the term of this patent is extended or adjusted under 35 U.S.C. 154(b) by 0 days.

(21) Appl. No.: 12/392,308

(22) Filed: Feb. 25, 2009

(65) Prior Publication Data

US 2009/0220186 A1    Sep. 3, 2009

Related U.S. Application Data

(60) Provisional application No. 61/064,243, filed on Feb. 25, 2008.

(51) Int. Cl.
G02B 6/032 (2006.01)
G02B 6/036 (2006.01)
G02B 6/02 (2006.01)

(52) U.S. Cl. .................. 385/125; 385/126; 385/123
(58) Field of Classification Search .......... 385/125, 385/126
See application file for complete search history.

(56) References Cited

U.S. PATENT DOCUMENTS

2003/0059185 A1* 3/2003 Russell et al. ............... 385/125

FOREIGN PATENT DOCUMENTS

JP          2005-3932       *  1/2005

OTHER PUBLICATIONS

"Single-polarization single-mode photonic band gap filter," by Szpulak et al, Acta Physica Polonica A, vol. 111, No. 2, Feb. 2007, pp. 239-245.*
"A design method for single-polarization holey fibers with improved beam quality factor," by Tsuchida et al, IEEE Journal of Lightwave Technology, vol. 26, No. 14, Jul. 2008, pp. 2162-2167.*
"Polarization properties of phonic bandgap holey fibers," by Szpulak et al, Proceedings of SPIE, vol. 5950, 2005, p. 59501U-1 through 59501U-6.*
In-fiber polarizer based on a long-period fiber grating written on photonic crystal fiber, by Wang et al, Optics Letters, vol. 32, No. 9, May 2007, pp. 1035-1037.*

* cited by examiner

*Primary Examiner*—Charlie Peng
*Assistant Examiner*—Robert Tavlykaev
(74) *Attorney, Agent, or Firm*—George G. Wang; Wilkinson & Grist

(57) ABSTRACT

A hollow-core photonic bandgap fiber polarizer may include a core, an inner cladding surrounding the core, the inner cladding including a plurality of capillaries, and an outer cladding at least partially surrounding the inner cladding. A section of the capillaries distal to the core is asymmetric relative to a section of the capillaries proximal to the core.

17 Claims, 4 Drawing Sheets

HOLLOW-CORE PHOTONIC BANDGAP FIBER POLARIZER

Pursuant to 35 U.S.C. 119(e), this application claims priority to U.S. Provisional Application No. 61/064,243, entitled Hollow-core Photonic Bandgap Fiber Polarizer, which was filed on Feb. 25, 2008, the contents of which are hereby incorporated herein by reference.

BACKGROUND

Hollow-core photonic bandgap fibers are a type of optical fibers used to guide light. Hollow-core fibers may offer advantages over conventional optical fibers such as lower Rayleigh scattering, reduced non-linearity, improved dispersion characteristics, lower phase sensitivity to ambient temperature, and lower transmission loss.

A polarizer is a device that may significantly attenuate one direction of polarization of electromagnetic radiation, while allowing the orthogonal direction of polarization to pass through with relatively low loss. Polarizers may be combined with optical fibers to modify the radiation passing through the fibers. In-fiber polarizers may have advantages over combined fibers and polarizers, such as easier alignment, smaller insertion loss, and better compatibility with optical fiber systems. Conventional in-fiber polarizers typically are based on side-polished fibers, D-shaped fibers coated with an extra layer of material on the flat side, or 45-degree tilted fiber Bragg gratings. However, existing in-fiber polarizers are based on solid-core fibers. These polarizers may not be fully compatible with hollow-core fibers, because of the difficulties associated with the connection between solid core fibers and hollow-core fibers.

It is therefore desirable to develop an improved in-fiber polarizer fabricated on a hollow-core photonic bandgap fiber. It is also desirable to develop an improved method of making an in-fiber polarizer.

BRIEF SUMMARY

According to one aspect, a hollow-core photonic bandgap fiber polarizer may include a core, an inner cladding surrounding the core, the inner cladding including a plurality of capillaries, and an outer cladding at least partially surrounding the inner cladding. A section of the capillaries distal to the core is asymmetric relative to a section of the capillaries proximal to the core.

According to another aspect, a method of making a hollow-core photonic bandgap fiber polarizer may include stacking a plurality of capillaries or rods around a core to form a fiber preform, and drawing the preform into the fiber polarizer. The portion of the members of the preform that are distal to the core are asymmetric relative a portion of said members of the preform that are proximal to the core.

According to a further aspect, a method of making a hollow-core photonic bandgap fiber polarizer may include providing a fiber having a plurality of capillaries surrounding a core, and modifying the capillaries along a longitudinal direction of the fiber. A section of the capillaries distal to the core is made asymmetric relative to a section of the capillaries proximal to the core.

DETAILED DESCRIPTION

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the invention is not limited to the precise embodiments described below, and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention.

Polarizer Structure

Figure 1:
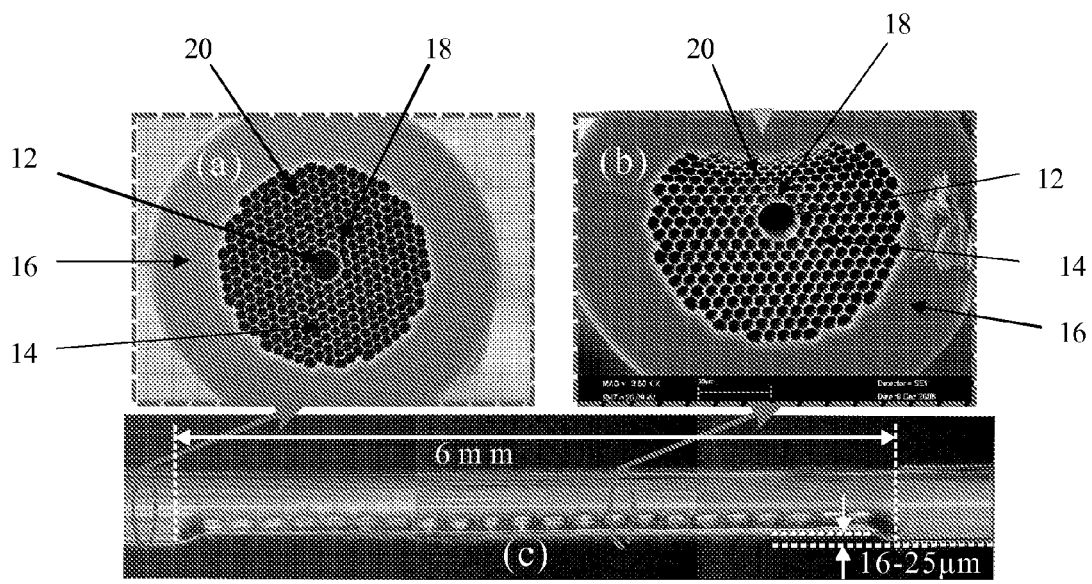
FIG. 1A depicts a cross-sectional scanning electron micrograph image of a hollow-core photonic bandgap fiber.
FIG. 1B depicts a cross-sectional scanning electron micrograph image of the fiber polarizer at a modified section.
FIG. 1C depicts a side view of the valley created on the fiber polarizer.

A hollow-core photonic bandgap fiber polarizer may include a core 12, an inner cladding 14 surrounding the core 12, the inner cladding 14 including a plurality of capillaries, and an outer cladding 16 at least partially surrounding the inner cladding 14, as depicted in FIGS. 1A, 1B and 1C. A section of the capillaries distal to the core 20 may be asymmetric relative to a section of the capillaries proximal to the core 18, as depicted in FIG. 1B. The inner cladding 14 may include silica and air, with an air-filling ratio of larger than 80%, or preferably larger than 90%. The outer cladding 16 may include silica. Solid rods made of silica may be used in place of the capillaries to form an asymmetric cross-sectional structure.

Within the inner cladding, light may be confined to the core by reflection off the inner cladding 14. Light with a propagation constant within the cladding bandgaps may not be able to escape the core 12, and may be guided along the fiber with little loss.

Figure 3:
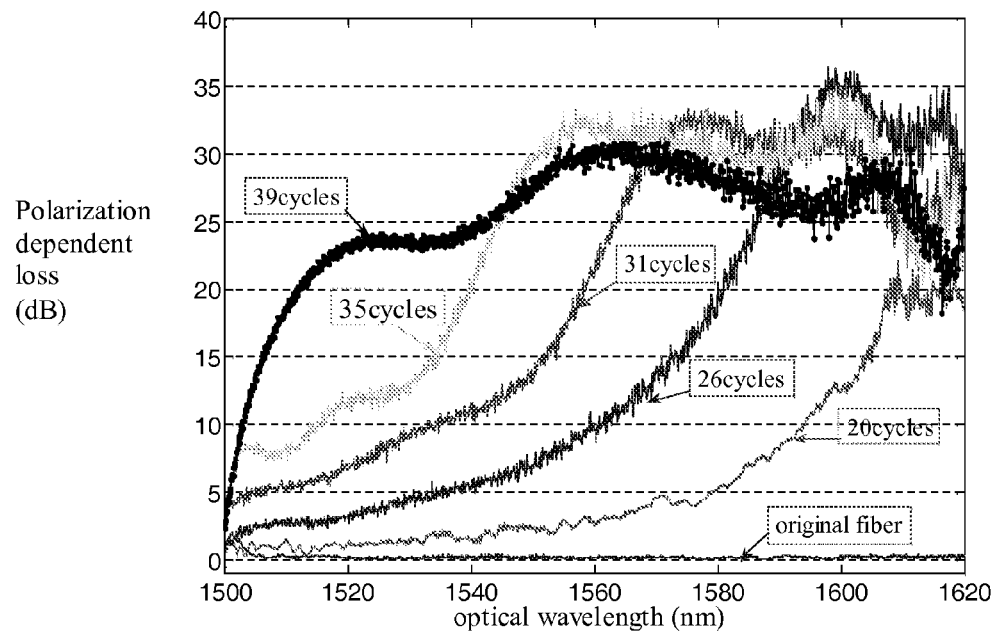
FIG. 3 depicts a graph of the evolution of polarization extinction ratio varying with the number of $CO_2$ laser scanning cycles.

The polarizer may have a length of from 1 to 6 mm, and may exhibit a polarization extinction ratio of larger than 25 dB over a wavelength range of larger than 100 nm, as depicted in FIG. 3. For example, the polarizers as depicted in FIGS. 1A to 1C and 3 were made from a commercial HC-1550-02 fiber (from Crystal Fiber A/S), and had a transmission window centered at 1550 nm. Polarizers may also be made in other commercial fibers such as HC-800-01 and HC-1060-02 (also from Crystal Fiber A/S) that have a transmission window centered at around 800 nm and 1060 nm, respectively. The transmission bands, or transmission windows, of the polarizer may be determined by the spacing between the holes of the capillaries, the hole diameters of the capillaries, and/or the air-filling content within the inner cladding.

Method of Making

Figure 5:
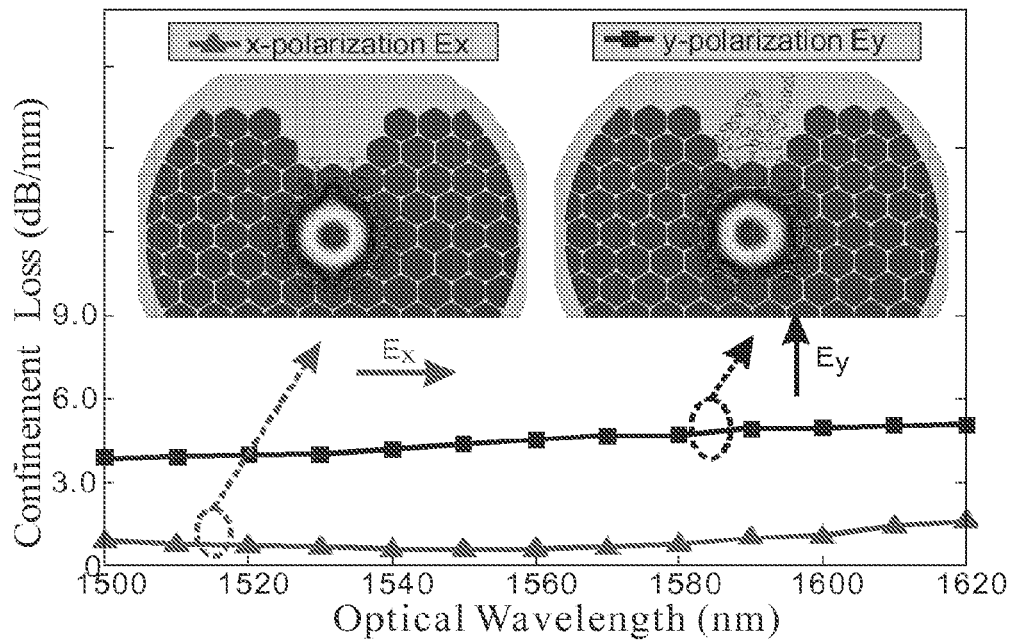
FIG. 5 depicts a calculated confinement loss of two orthogonal polarizations as functions of wavelength.

In one embodiment, a method of making a hollow-core photonic bandgap fiber polarizer may include stacking a plurality of capillaries or rods around a core to form a fiber preform, and drawing the preform into the fiber polarizer. The preform may be stacked such that the size, shape and/or distribution of the capillaries or rods distal to the core are made asymmetric relative to the size, shape and/or distribution of the capillaries or rods proximal to the core, as depicted in FIG. 5.

The stack and draw method may be carried out according to one of ordinary skill in the art. However, in this embodiment, different sizes, shapes, or numbers of capillaries may be stacked along one direction of the preform such that the distribution of the capillaries is asymmetric from the rest of the distribution. This type of waveguide asymmetry may result in a larger confinement loss for one linear polarization state as compared with the orthogonal linear polarization state, thus providing a linear polarizer. This method allows for fabricating a polarizing fiber at a variety of lengths. The polarizing fiber may be cut into shorter lengths, which may be used as compact in-fiber polarizers.

In another embodiment, a method of making a hollow-core photonic bandgap fiber polarizer may include providing a fiber having a plurality of capillaries surrounding a core, and modifying the capillaries along a longitudinal direction of the fiber. A section of the capillaries distal to the core is made asymmetric relative to a section of the capillaries proximal to the core, as depicted in FIG. 1B.

The modifying may include collapsing or deforming the size, shape or distribution of the capillaries distal to the core. The modifying also may include collapsing or deforming the shape of inner cladding. A method for deforming the capillaries may include using a pulsed $CO_2$ laser to scan transversely across a hollow-core photonic bandgap fiber over a few hundreds of micrometers to tens of millimeters along the longitudinal direction of the fiber. The resulting partial collapse of exposed capillaries may provide an asymmetric waveguide structure in which one polarization leaks out, while the orthogonal polarization propagates along the fiber with relatively low loss.

Figure 2:
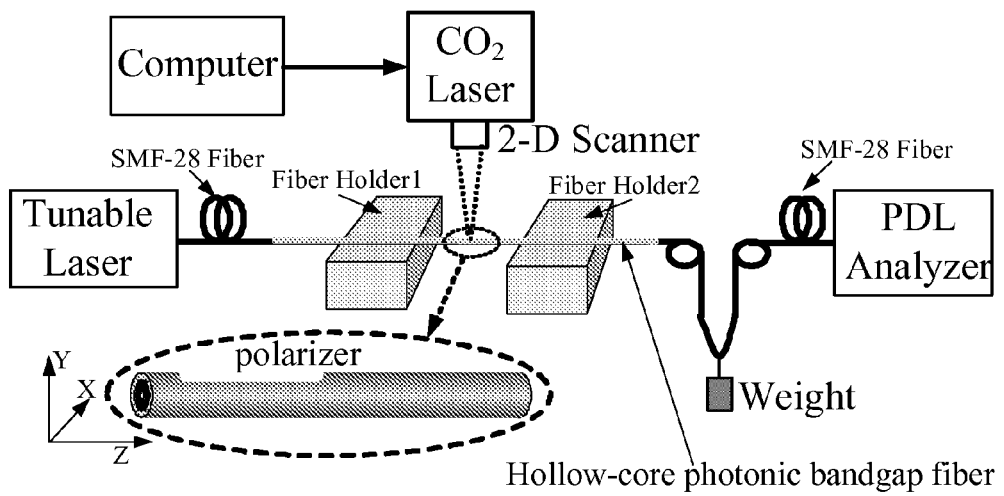
FIG. 2 depicts a schematic of $CO_2$ laser setup for fabricating a hollow-core photonic bandgap fiber polarizer.

An exemplary $CO_2$ laser setup for fabricating the hollow-core photonic bandgap fiber polarizer is depicted in FIG. 2. An Agilent 81910A photonic All Parameter Analyzer may be used to monitor the evolution of polarization dependent loss (PDL) during the fabrication process. The hollow-core photonic bandgap fiber may be spliced by Corning SMF-28 pigtail fibers at both ends with one pigtail connected to a tunable laser module with an adjustable polarization state, and another pigtail connected to the photo-detection module to record the wavelength dependent PDL.

A $CO_2$ laser beam may be focused on a spot on the fiber with a size from 10 to 100 µm in diameter. For example, the $CO_2$ beam may be focused to a spot size of about 35 µm, and may be transversely and longitudinally scanned via a computer controlled two-dimensional optical scanner. The laser beam may have a pulse width of from 1 to 20 µs, a repetition rate of from 1 to 50 kHz, and an average power of from 0.1 to 1 W. For example, the $CO_2$ laser may emit pulses with a width of 2.0 µs, a repetition rate of 10 kHz, and an average power of 0.2 W.

The high-frequency $CO_2$ laser pulse may impinge repeatedly on one side of the hollow-core photonic bandgap fiber, and may provide a local high temperature around a point along the surface of the fiber for each transverse scan. For each transverse scan, a section of the fiber along the longitudinal direction of the fiber may be affected by this heating, which may cause glass ablation on the surfaces of the fiber. The shape and size of the capillaries in the cladding of the heated section may also collapse. This may result in a notch or a groove transverse to the longitudinal direction of the fiber.

During the fabrication, the laser beam may be first transversely scanned across the fiber, and then longitudinally moved by a step size Λ of from 20 to 200 µm, and then transversely scanned again. Preferably, the laser beam may be moved by a step size Λ of from 20 to 50 µm. This process may be repeated for N times until a desired longitudinal movement of L=N*Λ may be reached. For example, N may range from 10 to 200 times. The entire process of making N successive transverse scan may be referred to as one scanning cycle.

The N successive traverse scans (i.e. one scanning cycle) may create N closely spaced notches, which may form a valley along the fiber surface with a length of approximately L=N*Λ. The depth of the valley may be increased by repeatedly scanning through the valley M times. For example, M may range from 1 to 100 times. The depth of the valley resulted from one scanning cycle (M=1) may be determined by the power of laser pulses. The depth of valley may increase with the increase of the number of scanning cycles M. The cross-section and side view of a valley created after dozens of cycles of $CO_2$ laser scanning across the hollow-core fiber of FIG. 1A are depicted in FIG. 1B and FIG. 1C, respectively.

Preferably, the fabrication parameters, such as the pulse width, peak power, repetition rate, and the number of scans M, are chosen such that partial collapse or deformation of the capillaries on one or more sides of the fiber occurs, but without any significant deformation in the hollow-core taking place. The capillaries distal to the core 20 may be largely deformed or even completely collapse, but the capillaries proximal to the core 18 should have only slight or no deformation, as depicted in FIG. 1B. This may ensure that light at the linear polarization orthogonal to the deformed region may experience a larger loss over a broad wavelength range in a distance of a few millimeters, while the other linear polarization parallel to the deformed region may experience a smaller loss. The significant loss of one of the polarizations may not be due to resonant coupling of the polarization to cladding. Instead, the loss may be due to the continuous leakage of polarization that may be caused by the poor confinement of that polarization relative to the other polarization.

The center wavelength, the spectral bandwidth, the extinction ratio (polarization dependent loss, PDL), and the insertion loss of the polarizer may be affected by the extent of the capillary deformation proximal to the inner cladding. The extent of deformation may be adjusted by varying the fabrication parameters such as the number of repeating scanning cycles M.

Evolution of Wavelength Dependence

The evolution of wavelength dependent PDL for different number of scanning cycles is depicted in FIG. 3. The PDL of the unmodified hollow-core fiber may be below 0.05 dB/m, and may increase with the number of scanning cycles. After 31 scanning cycles, a PDL of above 30 dB over a wavelength of wider than 50 nm (from 1570 to 1620 nm) may be achieved. After 39 scanning cycles, the PDL of above 23 dB over a wavelength of more than 100 nm (from between 1520 to 1620 nm) may be achieved. The insertion loss of the polarizer may depend on the number of scanning cycles. For 26 scanning cycles, the insertion loss may range from 1 to 1.8 dB over the wavelength range of from 1520 to 1620 nm. For 31 scanning cycles, the insertion loss may range from 3 to 4 dB over the wavelength range of from 1520 to 1620 nm. For 39 scanning cycles, the insertion loss may range from 5.5 to 7 dB over the wavelength range of from 1520 to 1620 nm.

Performance

The performance of the polarizer in terms of maximum PDL, wavelength range, and insertion loss may be affected by the dimension of the $CO_2$ laser treated region (the device length), and/or the depth of the valley. The number of transverse scans N and the longitudinal steps $\Lambda$ between each scan determine the device length, i.e. $L=N*\Lambda$. The valley depth is associated with the collapsed capillaries, and may be affected by the average power of $CO_2$ laser and the number of scanning cycles M.

For the same device length, a larger PDL may be achieved by a deeper valley; however, the insertion loss may become excessive if the valley depth is greater than about 25 μm. The average power of the $CO_2$ laser pulses affect the depth of the valley created in one scanning cycle, and may greatly influence the insertion loss. A high average energy pulse power may cause a higher insertion loss, while a lower average energy pulse power with more scanning cycles M may realize a lower loss to the polarizer, yet with sufficient PDL. A device length of at least 1 mm with reasonable depth may result in a higher PDL with acceptable insertion loss for the polarizer.

The unevenness or the periodic notches that formed the valley is believed to explain the fringe-like fluctuation in the PDL curve as depicted in FIG. 3. The periodic unevenness may excite higher order modes, and multi-mode interference may cause these fluctuations. The unevenness may be alleviated by modifying the fabricating procedure according to one of ordinary skill in the art. For example, a longitudinal displacement on the order of $\Lambda/2$ may be introduced in alternative scanning cycles. Better performance polarizers may be produced by optimizing the device length, the fabrication parameters, and the fabrication procedure, according to one of ordinary skill in the art.

Polarization Property

The polarization property of the hollow-core photonic bandgap fiber polarizer may be investigated using a polarization analyzer. For example, the polarization analyzer may be a Profile Opcische System PAT900B Kit (the Kit). The Kit may be programmed to produce linearly polarized light at different wavelengths, and the polarization direction may be rotated from 0° to 360°. The degree of polarization of the linearly polarized light may be at least 99.8% for every polarization direction.

Figure 4:
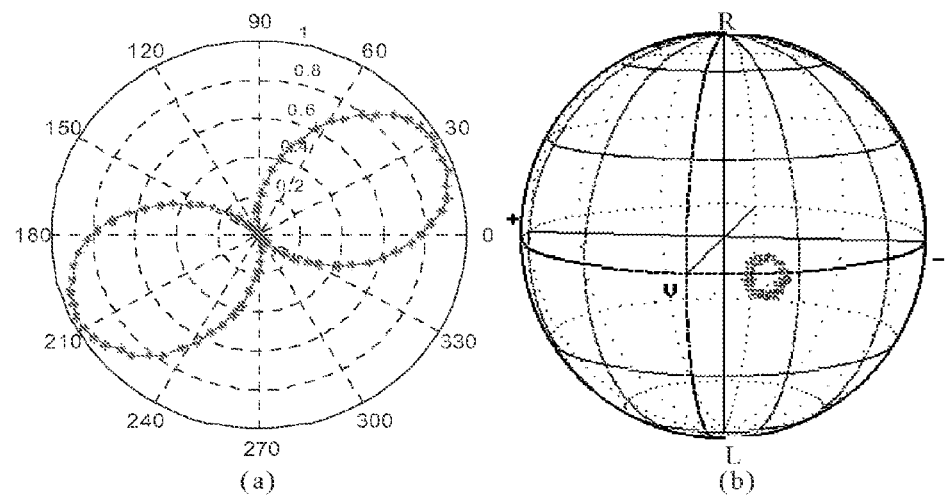
FIG. 4A depicts the response of a 3 mm hollow-core photonic bandgap fiber polarizer when input light is linearly polarized at 1550 nm with polarization direction varying from 0° to 360°.
FIG. 4B depicts a trace of output polarization state on a Poincare sphere when the input light evolved from left circular polarization to right circular polarization.

The normalized transmitted output light power from a 3 mm length hollow-core photonic bandgap fiber polarizer as a function of input polarization direction is depicted in FIG. 4A. The output of the polarizer may have two maxima and two minima for a 360° rotation of the input polarization direction. As shown in FIG. 4A, the output has peaks located at 25° and 205°, respectively, and has close to zero output at orthogonal directions. This indicates that the output from the polarizer is linearly polarized.

The Kit may also allow the polarization state of light transmission to be traced on a Poincare sphere when input polarization state evolves arbitrarily and repeatedly from left circularly polarized, to elliptically polarized, to linearly polarized, to right circularly polarized. The trace for a polarizer with 3 mm in length is depicted in FIG. 4B. The light output of the polarizer may remain approximately linearly polarized regardless of the state of input polarization.

PMI

Figure 7:
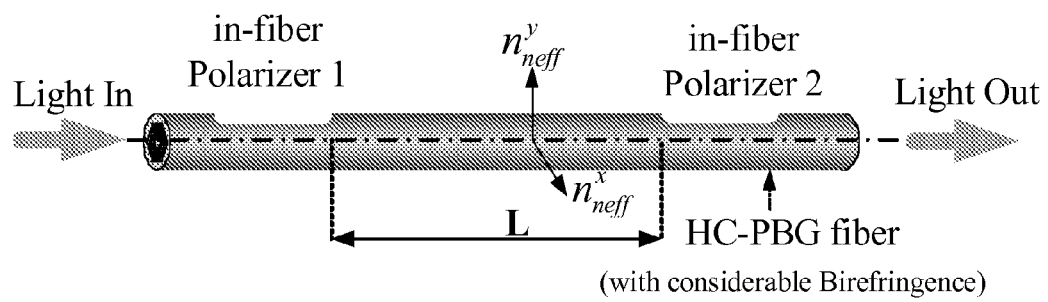
FIG. 7 depicts a compact polarization mode interferometer (PMI) formed by two in-fiber polarizers along a hollow-core photonic bandgap fiber.

In another embodiment, two in-fiber polarizers may be fabricated on the same hollow-core photonic bandgap fiber to form a polarimeter or a polarization mode interferometer (PMI), as depicted in FIG. 7. The PMI may function as a comb filter, which has small temperature dependence and may be used in telecommunications and sensor applications. The PMI may also function as a temperature insensitive strain sensor and/or a twist sensor.

The principal axis of the polarizers may be aligned with an angle φ with respect to the birefringence axes of the fiber. The angle φ may range from 45 to 135 degrees. Light entering after the first polarizer may excite the two orthogonal polarization eigen-modes, which may propagate along the fiber with different phase velocity. The modes may be combined and interfere at the second polarizer to generate periodic interference fringes. While not intending to be bound by theory, it is believed that the phase difference between the two orthogonal polarization modes is given by:

$$\phi = \frac{2\pi}{\lambda} BL \qquad (1)$$

Where L is the length separation between the two polarizers of the PMI; B is the birefringence of the fiber and λ is light wavelength in vacuum.

Figure 8:
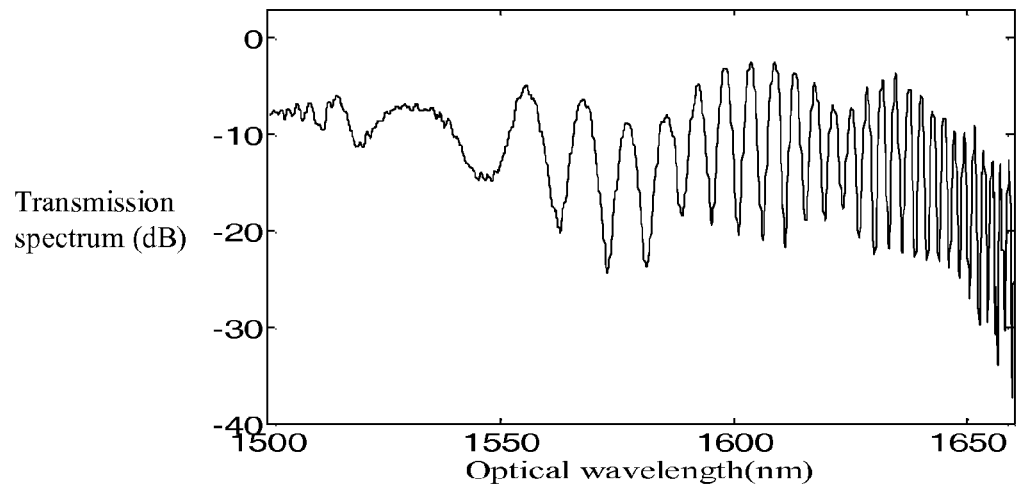
FIG. 8 depicts the transmission characteristics of the PMI of FIG. 7 as measured with an optical spectrum analyzer (OSA) with 0.1 nm resolution

The transmission spectrum of a PMI with a length of 531 mm is depicted in FIG. 8. The spectrum was measured with an optical spectrum analyzer (OSA, Aglient 86140B) and a SLED light source. The contrast of interference fringe was above 20 dB over a wavelength of about 100 nm.

The periodic transmission characteristics of the PMI suggest that it may be used as a stable comb filter with small or negligible temperature dependence. The spacing (period) of the comb may be adjusted by varying the length (L) of the PMI. The comb filter may be used for multi-wavelength generation for wavelength division multiplexed communication and sensor systems. The PMI may be used to measure the twist rate and to determine the twist direction simultaneously with a twist sensitivity of about 0.0144 nm/rad/m.

EXAMPLE

Example 1

Calculated Mode Field Distribution and Confinement Losses for a Simplified Structure For illustrating the behavior of the hollow core photonic bandgap fiber polarizer, the mode field distributions and confinement losses of the two principal polarization states for a simplified model structure was calculated, as depicted in FIG.

5. The parameters of the model structure were selected as follows: the spacing between the holes Λ was about 3.8 µm; the relative hole diameter d/Λ was about 0.96 µm; and the air filing fraction was about 90%. The mode fields of the two orthogonal polarizations at 1550 nm were calculated by using a full-vector finite-element method with perfectly matched layers, and are depicted in FIG. 5.

The model field of the y-polarization, as indicated in the contours at the right insert of FIG. 5, was not was well confined as compared to the x-polarization, as indicated in the contours at the left insert of FIG. 5. The calculated confinement loss of the y-polarization was significantly larger than that of the x-polarization over the wavelength range from 1500 nm to 1620 nm.

Example 2

Calculated Mode Field Distribution and Confinement Losses for a Modified Structure To further understand the large PDL over the broad wavelength range, the mode field distributions and the confinement losses of the two principal polarization states were calculated for a more complex model structure that resembled the polarizer of FIG. 1B.

Figure 6:
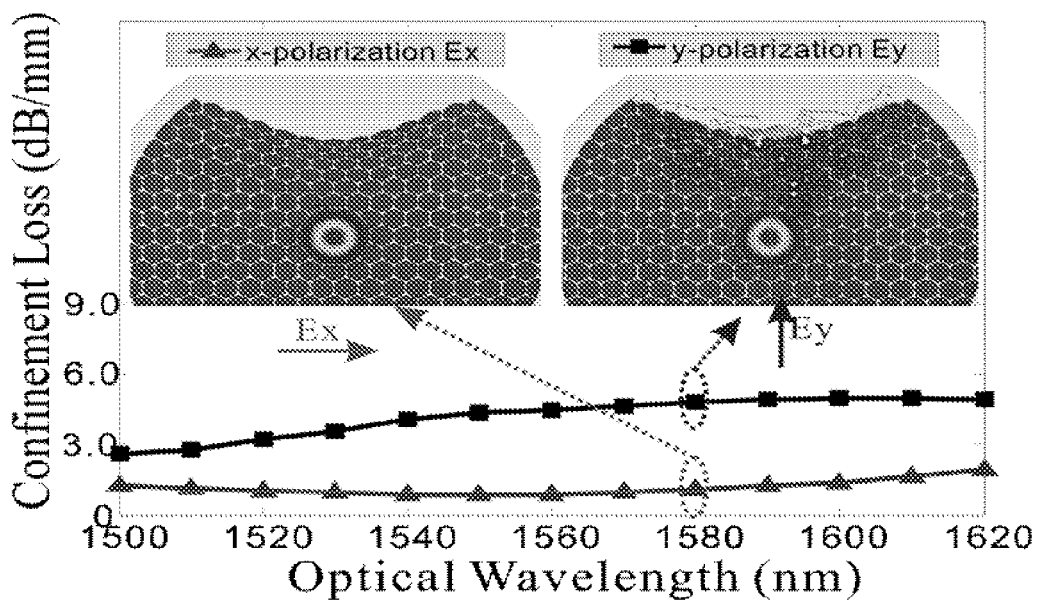
FIG. 6 depicts a calculated confinement losses of two orthogonal polarizations as functions of wavelength for the polarizer of FIG. 1B.

The model field of the y-polarization, as indicated in the contours in the right inset in FIG. 6, was not as well confined as compared to the x-polarization, as indicated in the contours at the left inset of FIG. 6. The calculated confinement loss of the y-polarization was significantly larger than that of the x-polarization over the wavelength range from 1500 to 1620 nm.

Example 3

PMI as Strain Sensors

The responses of the peak wavelengths of the interference fringes to the strain and temperature applied to the polarizers were studied. The interference fringes of PMIs moved toward short wavelength (blue-shift) with an increase of longitudinal stretching strain with a sensitivity of about 0.6 picometers per microstrain (or pm/µε). This value was similar to that of fiber Bragg grating (FBG) sensors. The temperature sensitivity depended on the length of the PMI and was about 0.17 pm/° C.-cm (picometers per ° C. for one centimeter of separation between the two polarizers). This temperature sensitivity was significantly smaller than that of the FBG sensors. Assuming a PMI of 5 cm in length, the temperature sensitivity was at least 10 times smaller. The results indicated the PMI may be used for temperature insensitive strain sensors.

Consequently, it may be concluded that the deformation or collapse of capillaries on one side of the cladding region may be responsible for the high PDL observed. The deformation of capillaries on one side of the cladding region may result in an asymmetric waveguide structure. The structure may lead to significant leakage of one direction of polarization, while the orthogonal direction of polarization may propagate along the waveguide with relatively low loss. The slight deformation of the hollow-core as shown in FIG. 1B may enhance the waveguide asymmetry and may also contribute to the PDL observed.

Moreover, the results of FIG. 5 indicate that a polarizing fiber may be fabricated during the preform fabrication process, where silica capillaries and rods may be stacked according to a pattern similar to that shown in FIG. 5. These structures may be subsequently drawn into optical fibers. This stack-and-draw procedure may be used to draw polarizing fibers of any length according to one of ordinary skill in the art. The exact pattern of distribution of capillaries and/or rods may affect the performance of the polarizing fiber. Capillaries and rods with different inner and outer diameters and shapes may be stacked together to form various patterns according to one of ordinary skill in the art.

While the polarizer and method have been described, it should be understood that the system is not so limited, and modifications may be made. The scope of the polarizer and method is defined by the appended claims, and all devices and methods that come within the meaning of the claims, either literally or by equivalence, are intended to be embraced therein.

What is claimed is:

1. A hollow-core photonic bandgap fiber polarizer, comprising:
    a substantially symmetric hollow core;
    an inner cladding surrounding said core, said inner cladding comprising a plurality of rings of capillaries with an innermost ring closest to said core and an outmost ring furthest from said core; and
    an outer cladding at least partially surrounding said inner cladding,
    wherein a longitudinal section of said capillaries in part of said inner cladding is deformed in an asymmetric manner by which deformation is progressively less severe from said outmost ring to said innermost ring and capillaries in at least said innermost ring are substantially not deformed.

2. The polarizer of claim 1, wherein said section extends from a few hundreds of micrometers to tens of millimeters along said inner cladding in a longitudinal direction.

3. The polarizer of claim 1, wherein said longitudinal section is 1 to 6 mm in length.

4. The polarizer of claim 1, further comprising a polarization extinction ratio greater than 25 dB.

5. The polarizer of claim 1, further comprising an operating wavelength range greater than 50 nm.

6. The polarizer of claim 1, wherein said inner cladding comprises air and silica.

7. The polarizer of claim 6, wherein said inner cladding further comprises an air filing ratio of larger than 90%.

8. A polarization mode interferometer, comprising a first polarizer according to claim 1 and a second polarizer according to claim 1, wherein said two polarizers are positioned in series along a same fiber separated by a predetermined distance longitudinally.

9. The hollow-core photonic bandgap fiber polarizer of claim 1, wherein said symmetric core is of a shape and size defined by removal of seven capillaries.

10. The hollow-core photonic bandgap fiber polarizer of claim 1, wherein said inner cladding comprises eight rings of capillaries, and capillaries in the innermost ring are not deformed while deformation becomes progressively severe from the second innermost ring to the outermost ring.

11. A method of making a hollow-core photonic bandgap fiber polarizer, comprising:
    providing a fiber having a plurality of capillaries surrounding a core; and
    modifying a section of said capillaries along a longitudinal direction of said fiber,
    wherein said section of said capillaries is deformed asymmetrically in a cross-sectional view.

12. The method of claim 11, wherein said modifying step comprises laser deforming or collapsing of said capillaries.

13. The method of claim 11, wherein said modifying comprises exposing said section to a pulsed $CO_2$ laser.

14. The method of claim 13, wherein said laser comprises a pulse width from 1 to 20 µs.

15. The method of claim 13, wherein said laser comprises a repetition rate from 1 to 50 kHz.

16. The method of claim 13, wherein said laser comprises an average power from 0.1 to 1 W.

17. The method of claim 13, wherein said modifying step comprises:
    scanning said laser transversely across said section, and continuing said scanning longitudinally along said section, with a step size between transverse scans from 20 to 200 µm.

* * * * *